US012810728B2

(12) United States Patent

Beaurepaire et al.

(10) Patent No.: US 12,810,728 B2

(45) Date of Patent: Nov. 24, 2026

(54) METHOD TO CONTEXTUALIZE PROXIMITY SENSING AROUND VEHICLES TO REDUCE ALARM FATIGUE

(71) Applicant: HERE GLOBAL B.V., Eindhoven (NL)

(72) Inventors: Jerome Beaurepaire, Nantes (FR); Jeremy Michael Young, Beverly Hills, MI (US)

(73) Assignee: HERE GLOBAL B.V., Eindhoven (NL)

( * ) Notice: Subject to any disclaimer, the term of this patent is extended or adjusted under 35 U.S.C. 154(b) by 141 days.

(21) Appl. No.: 18/811,777

(22) Filed: Aug. 22, 2024

(65) Prior Publication Data

US 2026/0057773 A1 Feb. 26, 2026

(51) Int. Cl.

| | |
|---|---|
| ***G08G 1/01*** | (2006.01) |
| ***B60Q 9/00*** | (2006.01) |
| ***G08G 1/052*** | (2006.01) |
| ***G08G 1/056*** | (2006.01) |
| ***G08G 1/16*** | (2006.01) |

(52) U.S. Cl.

CPC ............ *G08G 1/166* (2013.01); *B60Q 9/008* (2013.01); *G08G 1/0112* (2013.01); *G08G 1/0129* (2013.01); *G08G 1/052* (2013.01); *G08G 1/056* (2013.01)

(58) Field of Classification Search

CPC .... G08G 1/166; G08G 1/0112; G08G 1/0129; G08G 1/052; G08G 1/056; B60Q 9/008

See application file for complete search history.

(56) References Cited

U.S. PATENT DOCUMENTS

| | | | |
|---|---|---|---|
| 9,514,651 B2 | 12/2016 | Linder et al. | |
| 9,569,967 B2 | 2/2017 | Petridis et al. | |
| 9,766,625 B2 * | 9/2017 | Boroditsky | B60W 60/0013 |
| 10,569,771 B2 | 2/2020 | Song et al. | |
| 11,282,383 B1 * | 3/2022 | Libin | G06N 20/00 |
| 11,814,065 B1 | 11/2023 | Post et al. | |
| 2018/0134116 A1 * | 5/2018 | Chen | B60H 1/00742 |
| 2018/0286258 A1 | 10/2018 | Derbanne | |
| 2023/0249693 A1 * | 8/2023 | Mukundan | G06V 40/193 340/425.5 |

(Continued)

OTHER PUBLICATIONS

Ka et al., "Study on the Framework of Intersection Pedestrian Collision Warning System Considering Pedestrian Characteristics", Transportation Research Record, vol. 2673, Issue No. 5, 2019, pp. 747-758.

(Continued)

*Primary Examiner* — Sisay Yacob

(74) *Attorney, Agent, or Firm* — Michael Yu; HERE GLOBAL B.V.

(57) ABSTRACT

A system to system to contextualize proximity sensing around vehicles to reduce alarm fatigue for a driver of a vehicle is disclosed. The system may provide different degrees of warning for potential impacts with objects, most specifically centered around if an impact is in fact possible and has some level of severity. If no impact is possible or likely, then a general notice or alert of proximity may be acceptable, but can be handled in a more gentle or unobtrusive way so as not to cause confusion for a driver.

20 Claims, 4 Drawing Sheets

(56) References Cited

U.S. PATENT DOCUMENTS

| | | | | |
|---|---|---|---|---|
| 2024/0059281 | A1* | 2/2024 | Newman | B60W 30/09 |
| 2024/0157951 | A1* | 5/2024 | Kyle | G06F 8/60 |

OTHER PUBLICATIONS

"IEEE 802.11" Wikipedia, Retrieved on Aug. 8, 2024, Webpage available at https://en.wikipedia.org/wiki/IEEE_802.11.
"IEEE 802.16" Wikipedia, Retrieved on Jul. 23, 2024, Webpage available at https://en.wikipedia.org/wiki/IEEE_802.16.
"IMT-2020" Wikipedia, Retrieved on Jun. 13, 2024, Webpage available at https://en.wikipedia.org/wiki/IMT-2020.

* cited by examiner

METHOD TO CONTEXTUALIZE PROXIMITY SENSING AROUND VEHICLES TO REDUCE ALARM FATIGUE

TECHNOLOGICAL FIELD

An example aspect of the present disclosure generally relates to promoting driver safety around other vehicles and objects, and more particularly, but without limitation relates to a system, a method, and a computer program product to contextualize proximity sensing around vehicles to reduce alarm fatigue of drivers.

BACKGROUND

Beeps from proximity sensors are not contextual enough, they do not consider:

the directionality of the wheels (as in the below example); or the available space around the vehicle (eg. at tolls) which could be captured by LIDAR systems.

Instead proximity sensors, generally a simple form of radar, are only looking at something that is a certain distance away from vehicle and warning when things come closer in range. This is often accomplished by using a series of radar sensors on the front, rear, and possibly sides of a vehicle.

These are demonstrated graphically to users in the head-unit combined with a series of audible beeps for the driver to be aware. Too much beeping or alerts when not relevant will cause drivers to ignore the alerts even when they are relevant.

Alarm fatigue or alert fatigue describes how busy workers (in the case of health care, clinicians) become desensitized to safety alerts, and as a result ignore or fail to respond appropriately to such warnings.

Alarm fatigue occurs in many fields, including construction and mining (where backup alarms sound so frequently that they often become senseless background noise), healthcare (where electronic monitors tracking clinical information such as vital signs and blood glucose sound alarms so frequently, and often for such minor reasons, that they lose the urgency and attention-grabbing power which they are intended to have), and the nuclear power field. Like crying wolf, such false alarms rob the critical alarms of the importance they deserve. Alarm management and policy are critical to prevent alarm fatigue.

These indicators are meant to help drivers with information, however the information provided in this situation is very limited and can be much more refined. Ideally a warning system should have different degrees of warning, most specifically centered around if an impact is in fact possible. If no impact is possible, then a general notice of proximity is fine, but can be handled in a more gentle way so as not to cause confusion with a driver.

BRIEF SUMMARY

The present disclosure provides a system, a method and a computer program product to contextualize proximity sensing around vehicles to reduce alarm fatigue, in accordance with various aspects.

Aspects of the disclosure provide a computer-implemented method to contextualize proximity sensing around vehicles to reduce alarm fatigue for a driver of a vehicle. The method may include: detecting, by one or more sensors in communication with the vehicle, one or more objects in relative proximity to the vehicle in any direction from the vehicle; determining a steering wheel position of the vehicle; determining a speed of the vehicle; determining a relative motion of the one or more objects in relative proximity to the vehicle in any direction from the vehicle; determining a projected path of the vehicle based on the one or more objects in relative proximity to the vehicle in any direction from the vehicle, the steering wheel position of the vehicle, a rate of change of the steering wheel position of the vehicle, and what actions from the steering wheel and gas/brake control could create an impact; determining an impact probability of the vehicle with the one or more objects based on the projected path of the vehicle and a relative motion of the object in relation to the vehicle; determining a projected severity of impact based on impact parameters for the vehicle and the one or more objects; and providing an alert to the driver of the vehicle based on a level of the impact probability and the projected severity of impact.

Aspects of the disclosure may provide a system to contextualize proximity sensing around vehicles to reduce alarm fatigue for a driver of a vehicle. The system may include: at least one memory configured to store computer executable instructions; and at least one processor configured to execute the computer executable instructions to: detect, by one or more sensors in communication with the vehicle, one or more objects in relative proximity to the vehicle in any direction from the vehicle; determine a steering wheel position of the vehicle; determine a speed of the vehicle; determine a relative motion of the one or more objects in relative proximity to the vehicle in any direction from the vehicle; determine a projected path of the vehicle based on the one or more objects in relative proximity to the vehicle in any direction from the vehicle, the steering wheel position of the vehicle, a rate of change of the steering wheel position of the vehicle, and what actions from the steering wheel and gas/brake control could create an impact; determine an impact probability of the vehicle with the one or more objects based on the projected path of the vehicle and a relative motion of the object in relation to the vehicle; determine a projected severity of impact based on impact parameters for the vehicle and the one or more objects; and provide an alert to the driver of the vehicle based on a level of the impact probability and the projected severity of impact.

Aspects of the disclosure may provide a computer program product comprising a non-transitory computer readable medium having stored thereon computer executable instructions, which when executed by one or more processors, cause the one or more processors to carry out operations to to contextualize proximity sensing around vehicles to reduce alarm fatigue for a driver of a vehicle, the operations comprising: detecting, by one or more sensors in communication with the vehicle, one or more objects in relative proximity to the vehicle in any direction from the vehicle; determining a steering wheel position of the vehicle; determining a speed of the vehicle; determining a relative motion of the one or more objects in relative proximity to the vehicle in any direction from the vehicle; determining a projected path of the vehicle based on the one or more objects in relative proximity to the vehicle in any direction from the vehicle, the steering wheel position of the vehicle, a rate of change of the steering wheel position of the vehicle, and what actions from the steering wheel and gas/brake control could create an impact; determining an impact probability of the vehicle with the one or more objects based on the projected path of the vehicle and a relative motion of the object in relation to the vehicle; determining a projected severity of impact based on impact parameters for the vehicle and the one or more objects; and providing an alert to the driver of the vehicle based on a level of the impact probability and the projected severity of impact.

The foregoing summary is illustrative only and is not intended to be in any way limiting. In addition to the illustrative aspects, aspects, and features described above, further aspects, aspects, and features will become apparent by reference to the drawings and the following detailed description.

BRIEF DESCRIPTION OF THE DRAWINGS

Figure 1:
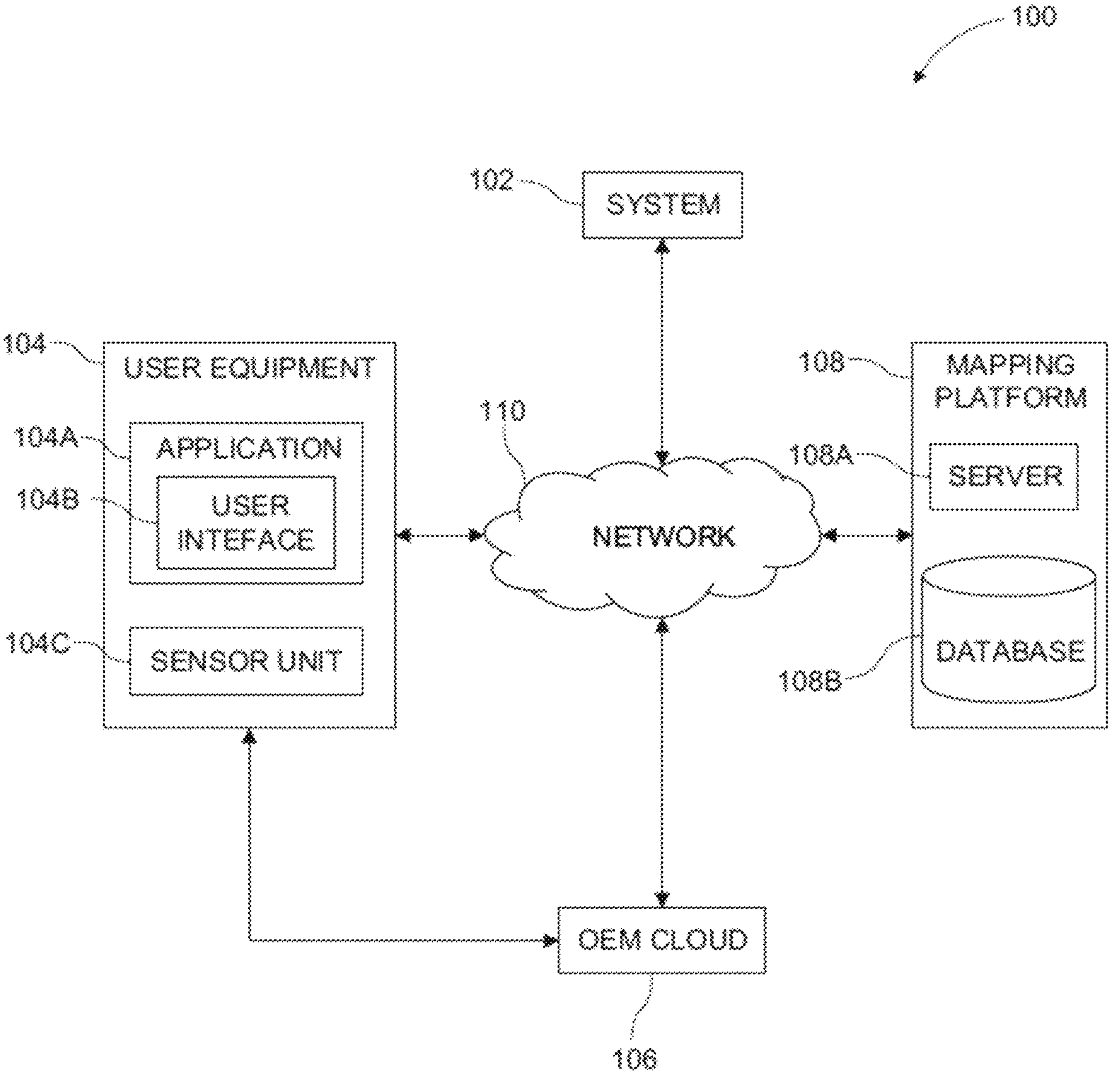
Figure 2:
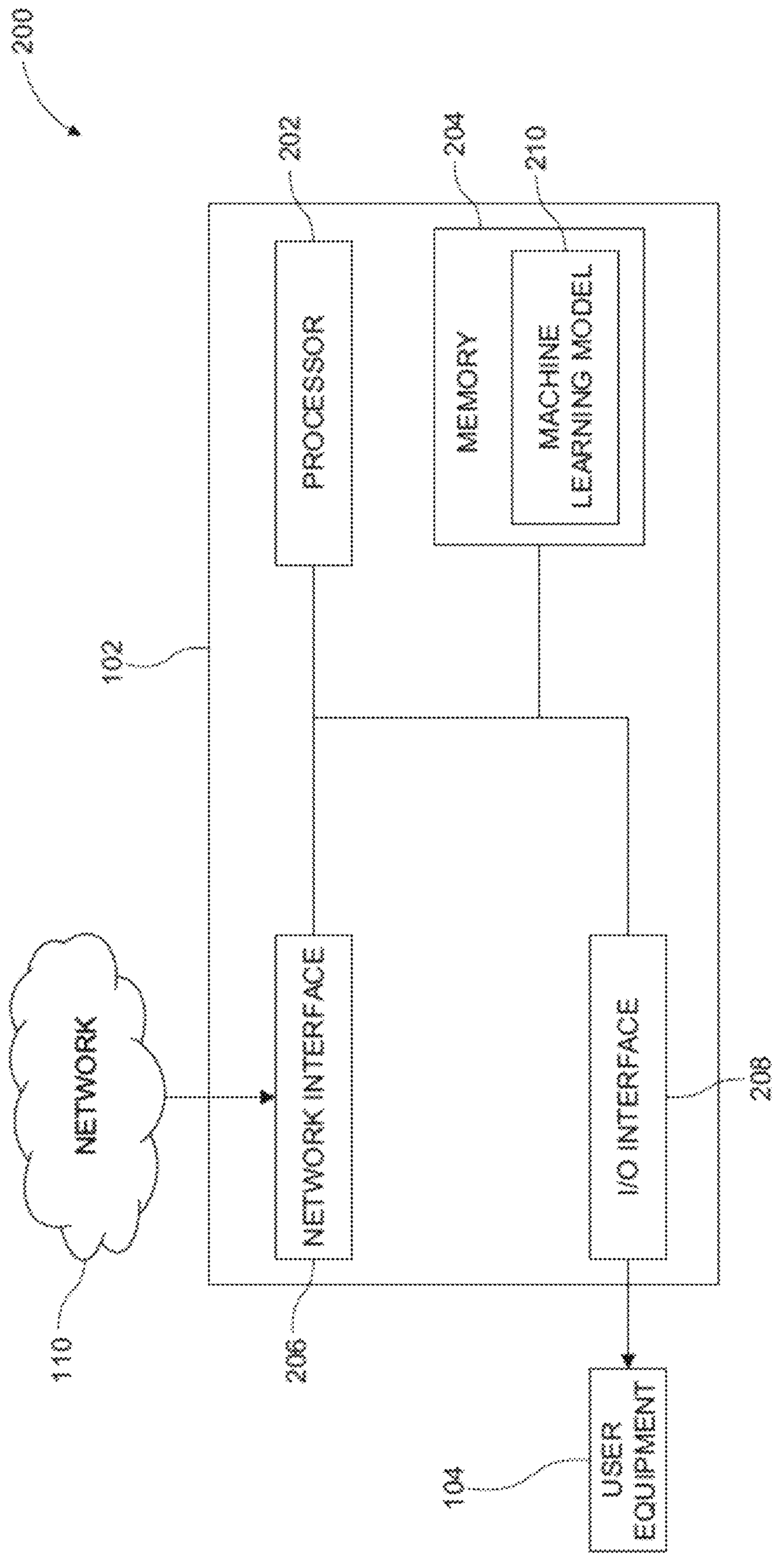
Figure 3:
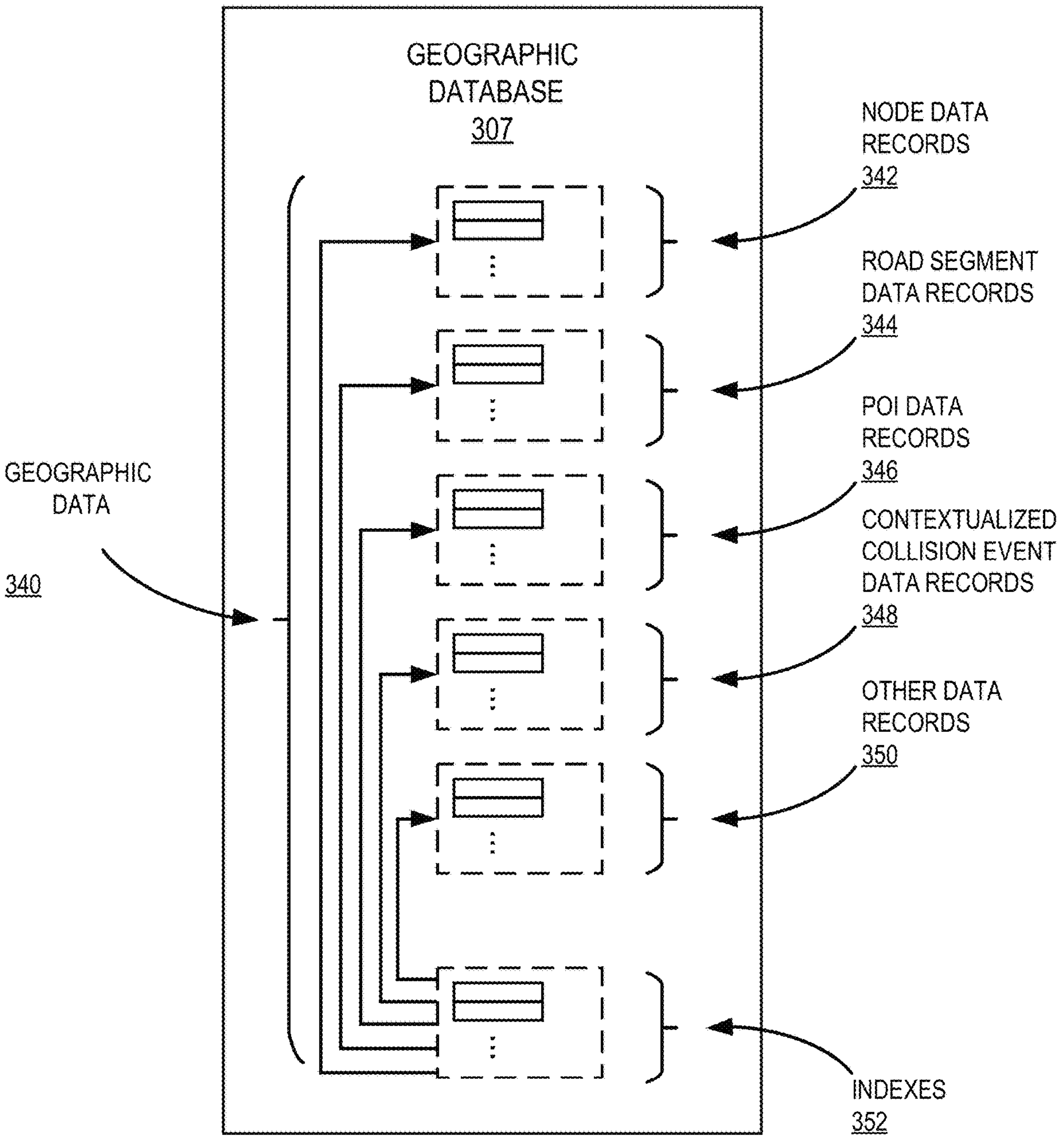
Figure 4:
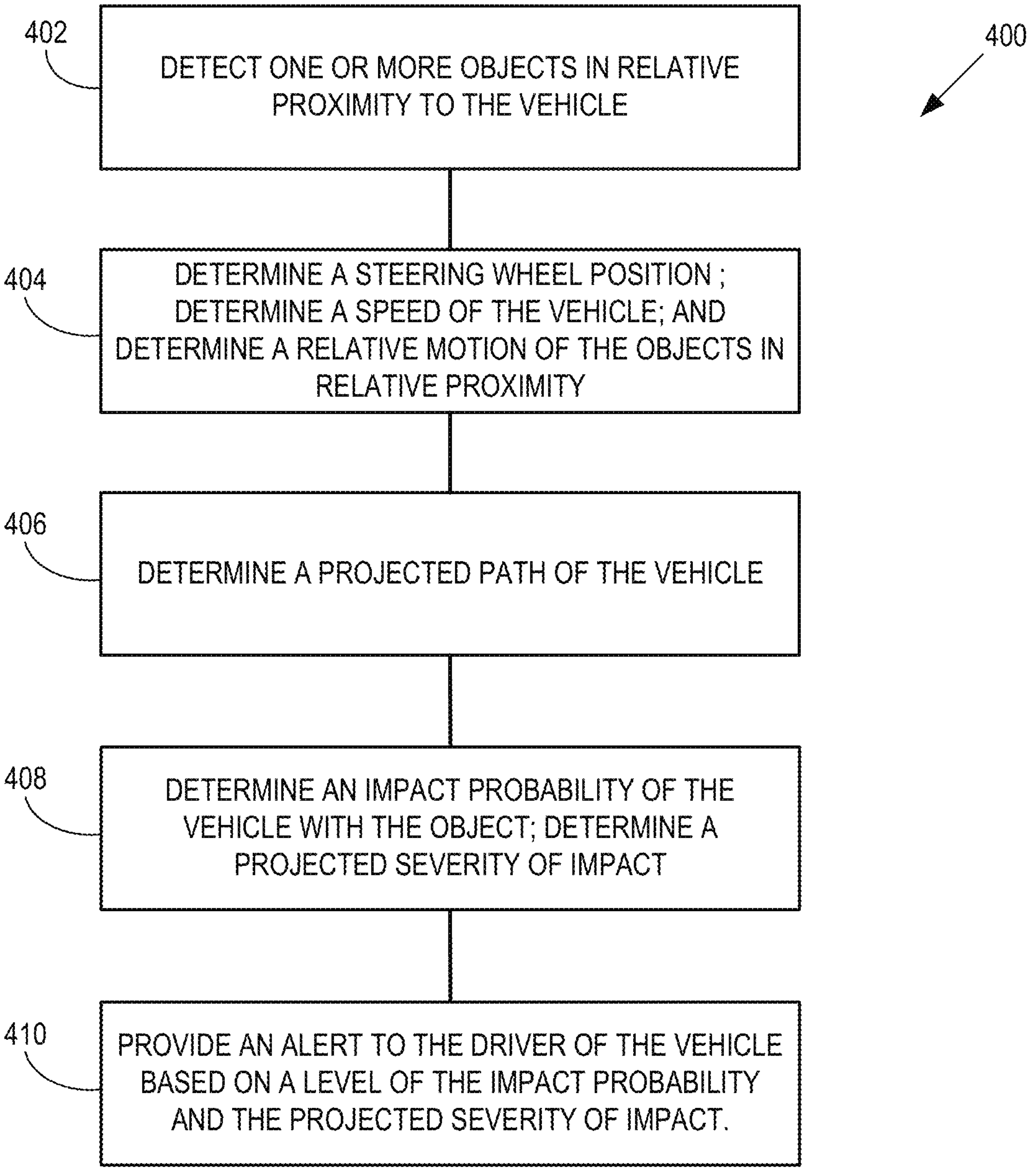

Having thus described certain aspects of the disclosure in general terms, reference will now be made to the accompanying drawings, which are not necessarily drawn to scale, and wherein:

FIG. 1 illustrates a schematic diagram of a network environment 100 of a system 102 for contextualizing proximity sensing around vehicles to reduce alarm fatigue for a driver of a vehicle, in accordance with an example aspect;

FIG. 2 illustrates a block diagram of the system for contextualizing proximity sensing around vehicles to reduce alarm fatigue for a driver of a vehicle, in accordance with an example aspect;

FIG. 3 illustrates an example the map or geographic database for use by the system for contextualizing proximity sensing around vehicles to reduce alarm fatigue for a driver of a vehicle, in accordance with an example aspect; and FIG. 4 illustrates a flowchart 400 for acts taken in an exemplary method for contextualizing proximity sensing around vehicles to reduce alarm fatigue for a driver of a vehicle, in accordance with an aspect.

DETAILED DESCRIPTION

Some aspects of the present disclosure will now be described more fully hereinafter with reference to the accompanying drawings, in which some, but not all, aspects are shown. Indeed, various aspects may be embodied in many different forms and should not be construed as limited to the aspects set forth herein; rather, these aspects are provided so that this disclosure will satisfy applicable legal requirements. Like reference numerals refer to like elements throughout. As used herein, the terms “data,” “content,” “information,” and similar terms may be used interchangeably to refer to data capable of being transmitted, received and/or stored in accordance with aspects of the present disclosure. Thus, use of any such terms should not be taken to limit the spirit and scope of aspects of the present disclosure.

For purposes of this disclosure, though not limiting or exhaustive, “vehicle” refers to standard gasoline powered vehicles, hybrid vehicles, an electric vehicle, a fuel cell vehicle, and/or any other mobility implement type of vehicle (e.g., bikes, scooters, etc.). The vehicle includes parts related to mobility, such as a powertrain with an engine, a transmission, a suspension, a driveshaft, and/or wheels, etc. The vehicle may be a non-autonomous vehicle or an autonomous vehicle. The term autonomous vehicle (AV) may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one aspect, the vehicle may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

A goal of the present disclosure is to provide different degrees of warning, most specifically centered around if an impact is in fact possible and has some level of severity. If no impact is possible or likely, then a general notice or alert of proximity may be acceptable, but can be handled in a more gentle or unobtrusive way so as not to cause confusion for a driver.

In an aspect, a system to contextualize proximity sensing around vehicles to reduce alarm fatigue for a driver of a vehicle may make the beeping warnings smarter by not beeping if no collision is possible by considering direction of the car path based on steering wheel position. As an example, a conventional back-up camera may show a projected path. Based on a steering wheel position, a vehicle should be able to easily calculate its impact possibility based on relative distance to the objects. In addition, vehicle-based radar itself is very simple, and may not be able to precisely determine this information to within cm accuracy, but it should be able to determine with greater accuracy the likelihood of impact based on steering wheel position and motion of the vehicle, the motion of objects in proximity to the vehicle and change in motion of the objects. As an alert, the varying impact probabilities and impact severities may be visually demonstrated in the head unit differently to help drivers.

In another aspect, the system may provide a possible solution with a different type of beep to make driver aware proximity is close, but collision is not an issue, vs both proximity is close and current path would result in collision. The alert to the driver may include varying at least one of a volume of an audible alert, a frequency of the audible alert, a pattern of the audible alert or a combination thereof based on level of the impact probability and the projected severity of impact.

In an aspect, the system may incorporate other sensors such as LiDAR solutions needed to get a more precise measurement of the surroundings of the vehicle. However, with the addition of 360 camera views around a vehicle, a close spatial field resolution should be possible from imagery supported by radar. Once tied into the vehicle steering system, the system may determine an impact probability of the vehicle with the one or more objects based on the projected path of the vehicle and a relative motion of the object in relation to the vehicle and in an aspect, determine a projected severity of impact based on impact parameters for the vehicle and the one or more objects.

In an aspect of the disclosure, the disclosed system may also have the ability to pre-determine a path based on its surroundings and what actions from the steering wheel and gas/brake control could create an impact. For example, if once parked, a vehicle using its sensors is able to determine three dimensionally its proximity to everything surrounding it, then the system may determine a path needed with tolerance to successfully maneuver the obstacles detected. Rather than relying only on the radar or LiDar as a warning, instead the disclosed system may use a pre-calculated maneuver profile and warn a driver if deviating from that maneuver profile may result in an impact of note or concern.

Knowing the dimensional measurements of a vehicle and distance to objects through sensors, the geometry of safe vs unsafe path may be determined and then shown to a vehicle driver to better understand if they are on a path to hit an object, or a safe path. This solution provides better safety to the vehicle that simply highlighting a projected trajectory of the vehicle on a display.

Mobile Objects

In an aspect, the disclosed system may provide for smarter proximity warning by considering mobile obstacles and objects that might be moving around the vehicle. Some of these objects may be absolute in warning-if a pedestrian is present, a vehicle should not try to use conventional technology to estimate impact as a human can be unpredictable and may move suddenly.

However, some objects like a moving car, or rolling shopping cart may only have certain options of movement. For example, the shopping cart it cannot move sideways, but rather mostly forward and backward. In an aspect, these considerations can be factored into possible movement areas.

Often objects like a moving vehicle or a rolling shopping cart will be on a trajectory which will continue and be considered very predictable—the biggest risk is if the object stops, in which case ADAS related stopping functions should be employed as a safety net to avoid impact.

In an aspect the disclosed warning system may calculate the time needed to which the object has passed to demonstrate properly to the driver impact warnings or safe vehicle trajectory.

In a further aspect, a possible use case of the disclosed system is when the vehicle is being stopped at a traffic signal or stop sign and pedestrians are crossing in front of a vehicle. In an aspect, one solution for this situation is that so long as the car is stopped and brake is properly engaged, then there is no reason to sound an alarm of possible impact. The alarm may be omitted. In addition, with today's sensors and map data, understanding a vehicle is at a stop location, crosswalk, or traffic signal can also be used to help a vehicle determine that stopping with pedestrians crossing is a part of normal interactions in this location. Therefore, there is no need to alarm as long as the car is not in movement.

Other positional and locational contextual situations may emerge over time in patterns that emerge from specific locations that trigger sensor warnings. For example, a toll plaza with close barriers, or a small garage door that is only somewhat wider than the vehicle may be routinely based on historical travel patterns and mobility graphs of a driver, such that a driver going through these garage doors do not need a system beeping at them when they are safely navigating the door. With historical data, a location or geofence that is likely to have this issue can be cataloged in a map layer to provide assistance to vehicles giving them a warning that such a location with situation exists in their route.

The system may determine this historical data and/or mobility of the driver so that the disclosed system can be prepared ahead of time for more advanced calculations relying on other sensors as well (LiDar, imagery, radar, etc.) to determine a more precise vehicle path that is safe, and so long as the driver is keeping such a path then no need to send constant beeping warnings.

In an aspect, these locations and situations may be used to train machine learning model to create layers for a map and triggers for alerts in varying volume, frequency or absence as appropriate. In addition, the disclosed system can determine a proposed drive path through the same methods to reduce the need for the vehicle to calculate this directly onboard.

For example, a geofence area of a toll plaza, where barriers will be close to a vehicle, and safe proximity detection is possible, may be planned for as part of routing or electronic horizon and alerts varied or reduced to the driver, to reduce alert fatigue.

FIG. 1 illustrates a schematic diagram of a network environment 100 of a system 102 for contextualizing proximity sensing around vehicles to reduce alarm fatigue for a driver of a vehicle, in accordance with an example aspect. The system 102 may be communicatively coupled with, a user equipment (UE) 104, an OEM cloud 106, a mapping platform 108, via a network 110. The UE 104 may be a vehicle electronics system, onboard automotive electronics/computers, a mobile device such as a smartphone, tablet, smart watch, smart glasses, laptop, wearable device or other UE platforms known to one of skill in the art. The mapping platform 108 may further include a server 108A and a database 108B. The user equipment includes an application 104A, a user interface 104B, and a sensor unit 104C. Further, the server 108A and the database 108B may be communicatively coupled to each other.

The system 102 may comprise suitable logic, circuitry, interfaces and code that may be configured to process the sensor data obtained from the UE 104 for road and weather conditions in a region, that may be used to assist a user or driver to contextualize proximity sensing around vehicles to reduce alarm fatigue for a driver of a vehicle. Such features can also include a type of vehicle; traffic conditions; locations of objects both stationary and mobile, landmarks, POIs, traffic directions and signs, intersections, other vehicle traffic, pedestrian patterns; or a combination thereof.

The system 102 may be communicatively coupled to the UE 104, the OEM cloud 106, and the mapping platform 108 directly via the network 110. Additionally, or alternately, in some example aspects, the system 102 may be communicatively coupled to the UE 104 via the OEM cloud 106 which in turn may be accessible to the system 102 via the network 110.

All the components in the network environment 100 may be coupled directly or indirectly to the network 110. The components described in the network environment 100 may be further broken down into more than one component and/or combined together in any suitable arrangement. Further, one or more components may be rearranged, changed, added, and/or removed. Furthermore, fewer or additional components may be in communication with the system 102, within the scope of this disclosure.

The system 102 may be embodied in one or more of several ways as per the required implementation. For example, the system 102 may be embodied as a cloud-based service or a cloud-based platform. As such, the system 102 may be configured to operate outside the UE 104. However, in some example aspects, the system 102 may be embodied within the UE 104. In each of such aspects, the system 102 may be communicatively coupled to the components shown in FIG. 1 to carry out the desired operations and wherever required modifications may be possible within the scope of the present disclosure.

The UE 104 may be a vehicle electronics system, onboard automotive electronics/computers, a mobile device such as a smartphone, tablet, smart watch, smart glasses, laptop, wearable device and the like that is portable in itself or as a part of another portable/mobile object, such as, a vehicle known to one of skill in the art. The UE 104 may comprise a processor, a memory and a network interface. The processor, the memory and the network interface may be communicatively coupled to each other. In some example aspects, the UE 104 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In such example aspects, the UE 104 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the UE 104. Additional, different, or fewer components may be provided. For example, the UE 104 may be configured to execute and run mobile applications such as a messaging application, a browser application, a navigation application, and the like. In accordance with an aspect, the UE 104 may be directly coupled to the system 102 via the network 110. For example, the UE 104 may be a dedicated vehicle (or a part thereof) for gathering data for development of the map data in the database 108B. In some example aspects, the UE 104 may be coupled to the system 102 via the OEM cloud 106 and the network 110. For example, the UE 104 may be a consumer mobile phone (or a part thereof) and may be a beneficiary of the services provided by the system 102. In some example aspects, the UE 104 may serve the dual purpose of a data gatherer and a beneficiary device. The UE 104 may be configured to provide sensor data to the system 102. In accordance with an aspect, the UE 104 may process the sensor data for information that may be used for determining a context and likelihood of a vehicle having an impact with objects in its proximity, such as weather, traffic conditions, construction, visibility, pedestrian traffic, etc. Further, in accordance with an aspect, the UE 104 may be configured to perform processing related to contextualizing proximity sensing around vehicles to reduce alarm fatigue for a driver of a vehicle.

The UE 104 may include the application 104A with the user interface 104B to access one or more applications. The application 104B may correspond to, but not limited to, map related service application, navigation related service application and location-based service application. In other words, the UE 104 may include the application 104A with the user interface 104B. The user interface 104B may be a dedicated user interface configured to show locations of objects in relative proximity to a vehicle, the motion of the objects, size of the objects, etc. The user interface 104B may be in the form of a map depicting regions of heightened risk of collision with objects, such as pedestrian cross-walks, crowded areas or narrow streets or entrances to structures, according to aspects of the disclosure.

The sensor unit 104C may be embodied within the UE 104. The sensor unit 104C comprising one or more sensors may capture sensor data, in a certain geographic location. In accordance with an aspect, the sensor unit 104C may be built-in, or embedded into, or within interior of the UE 104. The one or more sensors (or sensors) of the sensor unit 104C may be configured to provide the sensor data comprising location data associated with a location of a user. In accordance with an aspect, the sensor unit 104C may be configured to transmit the sensor data to an Original Equipment Manufacturer (OEM) cloud. Examples of the sensors in the sensor unit 104C may include, but not limited to, a microphone, a camera, an acceleration sensor, a gyroscopic sensor, a LIDAR sensor, a proximity sensor, and a motion sensor.

The sensor data may refer to sensor data collected from a sensor unit 104C in the UE 104. In accordance with an aspect, the sensor data may be collected from a large number of mobile phones. In accordance with an aspect, the sensor data may refer to the point cloud data. The point cloud data may be a collection of data points defined by a given coordinates system. In a 3D coordinates system, for instance, the point cloud data may define the shape of some real or created physical objects. The point cloud data may be used to create 3D meshes and other models used in 3D modelling for various fields. In a 3D Cartesian coordinates system, a point is identified by three coordinates that, taken together, correlate to a precise point in space relative to a point of origin. The LIDAR point cloud data may include point measurements from real-world objects or photos for a point cloud data that may then be translated to a 3D mesh or NURBS or CAD model. In accordance with an aspect, the sensor data may be converted to units and ranges compatible with the system 102, to accurately receive the sensor data at the system 102. Additionally, or alternately, the sensor data of a UE 104 may correspond to movement data associated with a user of the user equipment. Without limitations, this may include motion data, position data, orientation data with respect to a reference and the like.

The mapping platform 108 may comprise suitable logic, circuitry, interfaces and code that may be configured to store map data associated with a geographic area in the region of interest related to geographic or other physical features that may lead to heightened risk of collision with objects, such as pedestrian cross-walks, crowded areas or narrow streets or entrances to structures. The map data may include traffic features and include historical (or static) traffic features such as road layouts, pre-existing road networks, business, educational and recreational locations, POI locations, historical and real-time weather conditions in the region or a combination thereof. The server 108A of the mapping platform 108 may comprise processing means and communication means. For example, the processing means may comprise one or more processors configured to process requests received from the system 102 and/or the UE 104. The processing means may fetch map data from the database 108B and transmit the same to the system 102 and/or the UE 104 in a suitable format. In one or more example aspects, the mapping platform 108 may periodically communicate with the UE 104 via the processing means to update a local cache of the map data stored on the UE 104. Accordingly, in some example aspects, map data may also be stored on the UE 104 and may be updated based on periodic communication with the mapping platform 108.

In an aspect, the map data may include, and the database 108B of the mapping platform 108 may store real-time, dynamic data about features determine a context and likelihood of a vehicle hitting an object in the surrounding proximity. For example, real-time data may be collected for determining a heightened risk of collision with objects, such as pedestrian cross-walks, crowded areas or narrow streets or entrances to structures, type of vehicle; traffic conditions; locations of objects both stationary and mobile, landmarks, POIs, traffic directions and signs, intersections, other vehicle traffic, pedestrian patterns; or a combination thereof. Other data records may include computer code instructions and/or algorithms for executing a trained machine learning model that is capable of contextualizing proximity sensing around vehicles to reduce alarm fatigue for a driver of a vehicle.

The database 108B of the mapping platform 108 may store map data of one or more geographic regions that may correspond to a city, a province, a country or of the entire world. The database 108B may store point cloud data collected from the UE 104. The database 108B may store data such as, but not limited to, node data, road segment data, link data, point of interest (POI) data, link identification information, and heading value records. The database 108B may also store cartographic data, routing data, and/or maneuvering data. According to some example aspects, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities for identifying location of building.

Optionally, the database 108B may contain path segment and node data records, such as shape points or other data that may represent raised features and vehicle speed control indications, links or areas in addition to or instead of the vehicle road record data. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database 108B may also store data about the POIs and their respective locations in the POI records. The database 108B may additionally store data about places, such as cities, towns, or other communities, and other geographic features such as bodies of water, and mountain ranges. Such place or feature data can be part of the POI data or can be associated with POIs or POI data records (such as a data point used for displaying or representing a position of a city). In addition, the database 108B may include event data (e.g., traffic incidents, construction activities, scheduled events, unscheduled events, accidents, diversions etc.) associated with the POI data records or other records of the database 108B. Optionally or additionally, the database 108B may store 3D building maps data (3D map model of objects) of structures, topography and other visible features surrounding roads and streets, including raised features on the roads.

The database 108B may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the UE 104. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the database 108B may be a master geographic database, but in alternate aspects, the database 108B may be embodied as a client-side map database and may represent a compiled navigation database that may be used in or with end user devices (such as the UE 104) to provide navigation and/or map-related functions. In such a case, the database 108B may be downloaded or stored on the end user devices (such as the UE 104).

The network 110 may comprise suitable logic, circuitry, and interfaces that may be configured to provide a plurality of network ports and a plurality of communication channels for transmission and reception of data, such as the sensor data, map data from the database 108B, etc. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 110 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 110 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) networks (for e.g. LTE-Advanced Pro), 5G New Radio networks, ITU-IMT 2020 networks, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

The system, apparatus, method and computer program product described above may be any of a wide variety of computing devices and may be embodied by either the same or different computing devices. The system, apparatus, etc. may be embodied by a server, a computer workstation, a distributed network of computing devices, a personal computer or any other type of computing device. The system, apparatus, method and computer program product may be configured to determine a context and likelihood of a vehicle hitting a an object it is surrounding proximity may similarly be embodied by the same or different server, computer workstation, distributed network of computing devices, personal computer, or other type of computing device.

Alternatively, the system, apparatus, method and computer program product may be embodied by a computing device on board a vehicle, such as a computer system of a vehicle, e.g., a computing device of a vehicle that supports safety-critical systems such as the powertrain (engine, transmission, electric drive motors, etc.), steering (e.g., steering assist or steer-by-wire), and/or braking (e.g., brake assist or brake-by-wire), a navigation system of a vehicle, a control system of a vehicle, an electronic control unit of a vehicle, an autonomous vehicle control system (e.g., an autonomous-driving control system) of a vehicle, a mapping system of a vehicle, an Advanced Driver Assistance System (ADAS) of a vehicle), or any other type of computing device carried by the vehicle. Still further, the apparatus may be embodied by a computing device of a driver or passenger on board the vehicle, such as a mobile terminal, e.g., a personal digital assistant (PDA), mobile telephone, smart phone, personal navigation device, smart watch, tablet computer, or any combination of the aforementioned and other types of portable computer devices.

FIG. 2 illustrates a block diagram 200 of the system 102, exemplarily illustrated in FIG. 1, to contextualize proximity sensing around vehicles to reduce alarm fatigue for a driver of a vehicle, in accordance with an example aspect. FIG. 2 is described in conjunction with elements from FIG. 1.

As shown in FIG. 2, the system 102 may comprise a processing means such as a processor 202, storage means such as a memory 204, a communication means, such as a network interface 206, an input/output (I/O) interface 208, and a machine learning model 210. The processor 202 may retrieve computer executable instructions that may be stored in the memory 204 for execution of the computer executable instructions. The system 102 may connect to the UE 104 via the I/O interface 208. The processor 202 may be communicatively coupled to the memory 204, the network interface 206, the I/O interface 208, and the machine learning model 210.

The processor 202 may comprise suitable logic, circuitry, and interfaces that may be configured to execute instructions stored in the memory 204. The processor 202 may obtain sensor data associated with locations of objects in relative proximity and imminent possibility of impact with the vehicle. The sensor data may be captured by one or more UE, such as the UE 104. The processor 202 may be configured to contextualize proximity sensing around vehicles to reduce alarm fatigue for a driver of a vehicl, based on the sensor data. The processor 202 may be further configured to determine, using a trained machine learning model in conjunction with ground truth of the region, to determine an impact probability of the vehicle with the one or more objects based on the projected path of the vehicle and a relative motion of the object in relation to the vehicle; and determine a projected severity of impact based on impact parameters for the vehicle and the one or more objects, where the ground truth of a region comprises current arrangements and positions of objects both stationary and mobile.

Examples of the processor 202 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits. The processor 202 may implement a number of processor technologies known in the art such as a machine learning model, a deep learning model, such as a recurrent neural network (RNN), a convolutional neural network (CNN), and a feed-forward neural network, or a Bayesian model. As such, in some aspects, the processor 202 may include one or more processing cores configured to perform independently. A multi-core processor may enable multiprocessing within a single physical package.

Additionally, or alternatively, the processor 202 may include one or more processors configured in tandem via the bus to enable independent execution of instructions, pipelining and/or multithreading. Additionally, or alternatively, the processor 202 may include one or processors capable of processing large volumes of workloads and operations to provide support for big data analysis. However, in some cases, the processor 202 may be a processor specific device (for example, a mobile terminal or a fixed computing device) configured to employ an aspect of the disclosure by further configuration of the processor 202 by instructions for performing the algorithms and/or operations described herein.

In some aspects, the processor 202 may be configured to provide Internet-of-Things (IoT) related capabilities to users of the UE 104 disclosed herein. The IoT related capabilities may in turn be used to provide smart city solutions by providing real time weather and road updates, big data analysis, and sensor-based data collection for providing navigation and charging locations near critical areas. The environment may be accessed using the I/O interface 208 of the system 102 disclosed herein.

The memory 204 may comprise suitable logic, circuitry, and interfaces that may be configured to store a machine code and/or instructions executable by the processor 202. The memory 204 may be configured to store information including processor instructions for training the machine learning model. The memory 204 may be used by the processor 202 to store temporary values during execution of processor instructions. The memory 204 may be configured to store different types of data, such as, but not limited to, sensor data from the UE 104. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, and interfaces that may be configured to communicate with the components of the system 102 and other systems and devices in the network environment 100, via the network 110. The network interface 206 may communicate with the UE 104, via the network 110 under the control of the processor 202. In one aspect, the network interface 206 may be configured to communicate with the sensor unit 104C disclosed in the detailed description of FIG. 1. In an alternative aspect, the network interface 206 may be configured to receive the sensor data from the OEM cloud 106 over the network 110 as described in FIG. 1. In some example aspects, the network interface 206 may be configured to receive location information of a user associated with a UE (such as, the UE 104), via the network 110. In accordance with an aspect, a controller of the UE 104 may receive the sensor data from a positioning system (for example: a GPS based positioning system) of the UE 104. The network interface 206 may be implemented by use of known technologies to support wired or wireless communication of the system 102 with the network 110. Components of the network interface 206 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer circuit.

The I/O interface 208 may comprise suitable logic, circuitry, and interfaces that may be configured to operate as an I/O channel/interface between the UE 104 and different operational components of the system 102 or other devices in the network environment 100. The I/O interface 208 may facilitate an I/O device (for example, an I/O console) to receive an input (e.g., sensor data from the UE 104 for a time duration) and present an output to one or more UE (such as, the UE 104) based on the received input. In accordance with an aspect, the I/O interface 208 may obtain the sensor data from the OEM cloud 106 to store in the memory 202. The I/O interface 208 may include various input and output ports to connect various I/O devices that may communicate with different operational components of the system 102. In accordance with an aspect, the I/O interface 208 may be configured to output mitigation and/or confirmation of critical areas to a user device, such as, the UE 104 of FIG. 1.

In example aspects, the I/O interface 208 may be configured to provide the data associated with likelihoods of impacts with objects and severity of impacts with a vehicle and external object to the database 108A to update the map of a certain geographic region. In accordance with an aspect, a user requesting information in a geographic region may be updated about historical (or static) road features, real-time or historical weather conditions, road conditions, road construction, etc. Examples of the input devices may include, but are not limited to, a touch screen, a keyboard, a mouse, a joystick, a microphone, and an image-capture device. Examples of the output devices may include, but are not limited to, a display, a speaker, a haptic output device or other sensory output devices.

In accordance with an aspect, the processor 202 may train the machine learning model 210 to assist in contextualizing proximity sensing around vehicles to reduce alarm fatigue for a driver of a vehicl. In an aspect of the disclosure, the processor 202 may determine, using a trained machine learning model in conjunction with ground truth of the region, to determine an impact probability of the vehicle with the one or more objects based on the projected path of the vehicle and a relative motion of the object in relation to the vehicle; and determine a projected severity of impact based on impact parameters for the vehicle and the one or more objects, where the ground truth of a region comprises current arrangements and positions of objects both stationary and mobile. In an aspect, a weighted linear regression model may be used to determine, using a trained machine learning model in conjunction with ground truth of the region, to determine an impact probability of the vehicle with the one or more objects based on the projected path of the vehicle and a relative motion of the object in relation to the vehicle; and determine a projected severity of impact based on impact parameters for the vehicle and the one or more objects, where the ground truth of a region comprises current arrangements and positions of objects both stationary and mobile. In another aspect, a look-up table may be used to determine, using a trained machine learning model in conjunction with ground truth of the region, to determine an impact probability of the vehicle with the one or more objects based on the projected path of the vehicle and a relative motion of the object in relation to the vehicle; and determine a projected severity of impact based on impact parameters for the vehicle and the one or more objects, where the ground truth of a region comprises current arrangements and positions of objects both stationary and mobile.

In another aspect, a machine learning model, such as the one or more trained machine learning model 210 discussed earlier, may be used to determine, using a trained machine learning model in conjunction with ground truth of the region, to determine an impact probability of the vehicle with the one or more objects based on the projected path of the vehicle and a relative motion of the object in relation to the vehicle; and determine a projected severity of impact based on impact parameters for the vehicle and the one or more objects, where the ground truth of a region comprises current arrangements and positions of objects both stationary and mobile. For the training of the trained machine learning model 210, different feature selection techniques and classification techniques may be used. The system 102 may be configured to obtain the trained machine learning model 210 and the trained machine learning model 210 may leverage historical information and real-time data to automatically determine, using a trained machine learning model in conjunction with ground truth of the region, to determine an impact probability of the vehicle with the one or more objects based on the projected path of the vehicle and a relative motion of the object in relation to the vehicle; and determine a projected severity of impact based on impact parameters for the vehicle and the one or more objects, where the ground truth of a region comprises current arrangements and positions of objects both stationary and mobile. In one aspect, supervised machine learning techniques may be utilized where ground truth data is used to train the model for different scenarios and then in areas where there is not sufficient ground truth data, the trained machine learning model 210 can be used to predict features or results.

In an aspect, the trained machine learning model 210 may be complemented or substituted with a transfer learning model. The transfer learning model may be used when the contextual factors related to likelihood of impact with external objects and severity of such impacts, such as type of vehicle; traffic conditions; locations of objects both stationary and mobile, landmarks, POIs, traffic directions and signs, intersections, other vehicle traffic, pedestrian patterns; or a combination thereof are unavailable, sparse, incomplete, corrupted or otherwise unreliable for predicting impacts with a vehicle. The transfer learning model may then use historical instances of vehicle impact with objects to predict and contextualize proximity impacts in a new region.

In accordance with an aspect, various data sources may provide the historical and real-time information on object impacts and associated severity and location, such as aggregations of locations and conditions leading to object impacts and their context for issuing alerts to a driver, for a given link at a given time as an input to the machine learning models 210. Examples of the machine learning models 210 may include, but not limited to, Decision Tree (DT), Random Forest, and Ada Boost. In accordance with an aspect, the memory 204 may include processing instructions for training of the machine learning model 210 with data sets that may be real-time (or near real time) data or historical data. In accordance with an aspect, the data may be obtained from one or more service providers.

FIG. 3 illustrates an example map or geographic database 307, which may include various types of geographic data 340. The database may be similar to or an example of the database 108B. The data 340 may include but is not limited to node data 342, road segment or link data 344, map object and point of interest (POI) data 346, contextualized collision event data records 348, or the like (e.g., other data records 350 such as traffic data, sidewalk data, road dimension data, building dimension data, vehicle dimension/turning radius data, etc.). Other data records may include computer code instructions and/or algorithms for executing a trained machine learning model that is capable of contextualizing proximity sensing around vehicles to reduce alarm fatigue for a driver of a vehicle.

A profile of end user mobility graph and personal activity information may be obtained by any functional manner including those detailed in U.S. Pat. Nos. 9,766,625 and 9,514,651, both of which are incorporated herein by reference. This data may be stored in one of more of the databases discussed above including as part of the contextualized collision event records 348 in some aspects. This data may also be stored elsewhere and supplied to the system 102 via any functional means.

In one aspect, the following terminology applies to the representation of geographic features in the database 307. A "Node"—is a point that terminates a link, a "road/line segment"—is a straight line connecting two points, and a "Link" (or "edge") is a contiguous, non-branching string of one or more road segments terminating in a node at each end. In one aspect, the geographic database 307 follows certain conventions. For example, links do not cross themselves and do not cross each other except at a node. Also, there are no duplicated shape points, nodes, or links. Two links that connect each other have a common node.

The geographic database 307 may also include cartographic data, routing data, and/or maneuvering data as well as indexes 352. According to some example aspects, the road segment data records may be links or segments representing roads, streets, or paths, as may be used in calculating a route or recorded route information for determination of object collision events for an area. The node data may be end points (e.g., intersections) corresponding to the respective links or segments of road segment data. The road link data and the node data may represent a road network, such as used by vehicles, cars, trucks, buses, motorcycles, bikes, scooters, and/or other entities.

Optionally, the geographic database 307 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The geographic database 307 can include data about the POIs and their respective locations in the POI records. The geographic database 307 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The geographic database 307 may be maintained by a content provider e.g., the map data service provider and may be accessed, for example, by the content or service provider processing server. By way of example, the map data service provider can collect geographic data and dynamic data to generate and enhance the map database and dynamic data such as weather- and traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device, as they travel the roads throughout a region.

The geographic database 307 may be a master map database, such as an HD map database, stored in a format that facilitates updates, maintenance, and development. For example, the master map database or data in the master map database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the geographic database 307 may be a master geographic database, but in alternate aspects, a client-side map database may represent a compiled navigation database that may be used in or with end user devices to provide navigation and/or map-related functions. For example, the map database may be used with the mobile device to provide an end user with navigation features. In such a case, the map database can be downloaded or stored on the end user device which can access the map database through a wireless or wired connection, such as via a processing server and/or a network, for example.

The contextualized collision event records 348 may include various points of data such as, but not limited to: a type of vehicle; traffic conditions; locations of objects both stationary and mobile, landmarks, POIs, traffic directions and signs, intersections, other vehicle traffic, pedestrian patterns; or a combination thereof.

FIG. 4 illustrates a flowchart 400 for acts taken in an exemplary method for contextualizing proximity sensing around vehicles to reduce alarm fatigue for a driver of a vehicle, in accordance with an aspect. More, fewer or different steps may be provided. FIG. 4 is explained in conjunction with FIG. 1 to FIG. 3. The control starts at act 402.

At act 402, the system 102 may detect, by one or more sensors in communication with the vehicle, one or more objects in relative proximity to the vehicle in any direction from the vehicle. In an aspect, the one or more sensors may include at least one of radar, LiDAR, a camera, such as front facing cameras in vehicles; cameras from other vehicles; head-mounted devices/glasses; vehicle sensors or other vehicles'sensors; traffic/safety cameras, or a combination thereof.

At act 404, the system 102 may, through sensors in communication with various parts of the vehicle, determine a steering wheel position of the vehicle; determine a speed of the vehicle; and determine a relative motion of the one or more objects in relative proximity to the vehicle in any direction from the vehicle. Sensors in communication with the vehicle, such as steering wheel angle sensors, cameras, radar, LiDAR or other positional sensors may be used by the system 102 to accomplish these acts.

At act 406, the system 102 may determine a projected path of the vehicle based on the one or more objects in relative proximity to the vehicle in any direction from the vehicle, the steering wheel position of the vehicle, a rate of change of the steering wheel position of the vehicle, and what actions from the steering wheel and gas/brake control could create an impact.

At act 408, the system 102 may determine an impact probability of the vehicle with the one or more objects based on the projected path of the vehicle and a relative motion of the object in relation to the vehicle and, in an aspect, determine a projected severity of impact based on impact parameters for the vehicle and the one or more objects. In an aspect, the impact parameters may include at least one of a size of the vehicle; a size of the one or more objects; an angle of impact between the vehicle and the one or more objects; and a relative velocity between the vehicle and the one or more objects. In a further aspect, the impact parameters may an unpredictability of motion of the one or more objects in relative proximity to the vehicle in any direction from the vehicle, such as an animate object having unpredictable motion—a human or animal that may move in any direction—or a rolling ball or collection of trash blown by the wind, compared to a wheeled vehicle such as a shopping cart that tends to move in one direction as it proceeds. Such unpredictability may affect the type of alert to be provided, with more unpredictable behavior and size of the object may make the context of the danger more severe and require a heightened alert. Likewise, a more predictable motion may reduce the impact probability and/or severity and merit a reduced or omitted alert, especially in parking lots of stores and shopping areas.

At act 410, the system 102 may provide an alert to the driver of the vehicle based on a level of the impact probability and the projected severity of impact. In an aspect, the aler may include varying at least one of a volume of an audible alert, a frequency of the audible alert, a pattern of the audible alert or a combination thereof based on level of the impact probability and the projected severity of impact.

In an aspect, the alert may include a visual alert on a display visible to the driver of the vehicle, where the visual alert changes based on the level of the impact probability and the projected severity of impact.

In a further aspect, providing the alert may include omitting an alert when the level of the impact probability and/or the projected severity of impact are below a relative threshold level.

In an aspect, the system 102 may additionally determine a mobility graph of the driver of the vehicle; determining a presence of one or more geofences related to the mobility graph of the driver; and providing a different alert to the driver based on the mobility graph of the driver, where the different alert is based on the commonality of the one or more objects in an historical travel pattern of the driver.

In an aspect, the system 102 may determine a type and magnitude of alert by determining a location of the vehicle relative to at least one of an intersection, a stop sign and/or a traffic light; and omitting the alert when the vehicle is stopped at the at least one of the intersection, the stop sign and/or the traffic light.

In a further aspect, a possible use case of the disclosed system is when the vehicle is being stopped at a traffic signal or stop sign and pedestrians are crossing in front of a vehicle. In an aspect, one solution for this situation is that so long as the car is stopped and brake is properly engaged, then there is no reason to sound an alarm of possible impact. The alarm may be omitted. In addition, with today's sensors and map data, understanding a vehicle is at a stop location, crosswalk, or traffic signal can also be used to help a vehicle determine that stopping with pedestrians crossing is a part of normal interactions in this location. Therefore, there is no need to alarm as long as the car is not in movement.

Other positional and locational contextual situations may emerge over time in patterns that emerge from specific locations that trigger sensor warnings. For example, a toll plaza with close barriers, or a small garage door that is only somewhat wider than the vehicle may be routinely based on historical travel patterns and mobility graphs of a driver, such that a driver going through these garage doors do not need a system beeping at them when they are safely navigating the door. With historical data, a location or geofence that is likely to have this issue can be cataloged in a map layer to provide assistance to vehicles giving them a warning that such a location with situation exists in their route.

The system 102 may determine this historical data and/or mobility of the driver so that the disclosed system can be prepared ahead of time for more advanced calculations relying on other sensors as well (LiDar, imagery, radar, etc.) to determine a more precise vehicle path that is safe, and so long as the driver is keeping such a path then no need to send constant beeping warnings.

In an aspect, the system 102 may generate a trained machine learning model based on at least one of the mobility graph of the driver of the vehicle, the geofence and the historical travel pattern of the driver; and providing the alert based on the trained machine learning model. The trained machine learning model 210 may be used to create layers for maps for use by drivers to benefit from patterns in the areas and contexts in which alerts may be generated, and formulate alerts in such a way to reduce alert fatigue for drivers.

It may be contemplated that various applications of the disclosed system 102 may arise in usage. Applications may include, for a mapping system:

Road Model—The system 102 may demonstrate where on a road link there is a region of interest where proximity detection issues will occur.

Lane Model—The system 102 may depict each lane to demonstrate the range of where such proximity detections would occur as a parametric range on the drive path.

Localization Objects—As an additional attribute of a localization object, the system 102 may indicate which objects will contribute to the sensor triggers for proximity warnings.

Blocks of the flowchart 400 support combinations of means for performing the specified functions and combinations of operations for performing the specified functions for performing the specified functions. It will also be understood that one or more blocks of the flowchart 500, and combinations of blocks in the flowchart 500, can be implemented by special purpose hardware-based computer systems which perform the specified functions, or combinations of special purpose hardware and computer instructions.

Alternatively, the system may comprise means for performing each of the operations described above. In this regard, according to an example aspect, examples of means for performing operations may comprise, for example, the processor 202 and/or a device or circuit for executing instructions or executing an algorithm for processing information as described above.

Although the aforesaid description of FIGS. 1-4 is provided with reference to the sensor data, however, it may be understood that the disclosure would work in a similar manner for different types and sets of data as well. The system 102 may generate/train the machine learning models 210 to evaluate different sets of data at various geographic locations. The update may be provided as a run time update or a pushed update.

It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an aspect of the present disclosure and executed by the processing circuitry 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that modifications and other aspects are intended to be included within the scope of the appended claims. Furthermore, in some aspects, additional optional operations may be included. Modifications, additions, or amplifications to the operations above may be performed in any order and in any combination.

Moreover, although the foregoing descriptions and the associated drawings describe example aspects in the context of certain example combinations of elements and/or functions, it should be appreciated that different combinations of elements and/or functions may be provided by alternative aspects without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method to contextualize proximity sensing around vehicles to reduce alarm fatigue for a driver of a vehicle, the method comprising:

detecting, by one or more sensors in communication with the vehicle, one or more objects in relative proximity to the vehicle in any direction from the vehicle;

determining a steering wheel position of the vehicle;

determining a speed of the vehicle;

determining a relative motion of the one or more objects in relative proximity to the vehicle in any direction from the vehicle;

determining a projected path of the vehicle based on the one or more objects in relative proximity to the vehicle in any direction from the vehicle, the steering wheel position of the vehicle, a rate of change of the steering wheel position of the vehicle, and what actions from the steering wheel and gas/brake control could create an impact;

determining an impact probability of the vehicle with the one or more objects based on the projected path of the vehicle and a relative motion of the object in relation to the vehicle;

determining a projected severity of impact based on impact parameters for the vehicle and the one or more objects; and providing an alert to the driver of the vehicle based on a level of the impact probability and the projected severity of impact; wherein providing the alert comprises providing a general notice or a less intrusive alert when the one or more objects are in relative proximity to the vehicle and no impact is possible or likely, and providing a different alert when proximity is close and the projected path indicates that collision is an issue.

2. The method of claim 1, wherein the impact parameters comprise at least one of a size of the vehicle; a size of the one or more objects; an angle of impact between the vehicle and the one or more objects; and/or a relative velocity between the vehicle and the one or more objects.

3. The method of claim 1, wherein providing the alert comprises varying at least one of a volume of an audible alert, a frequency of the audible alert, a pattern of the audible alert or a combination thereof based on level of the impact probability and the projected severity of impact.

4. The method of claim 1, wherein providing the alert comprises providing a visual alert on a display visible to the driver of the vehicle, wherein the visual alert changes based on the level of the impact probability and the projected severity of impact.

5. The method of claim 1, wherein providing the alert comprises omitting an alert when the level of the impact probability and/or the projected severity of impact are below a relative threshold level.

6. The method of claim 1, further comprising: determining a mobility graph of the driver of the vehicle; determining a presence of one or more geofences related to the mobility graph of the driver; and providing a different alert to the driver based on the mobility graph of the driver, wherein the different alert is based on the commonality of the one or more objects in an historical travel pattern of the driver.

7. The method of claim 6, further comprising generating a trained machine learning model based on at least one of the mobility graph of the driver of the vehicle, the geofence, and/or the historical travel pattern of the driver; and providing the alert based on the trained machine learning model.

8. The method of claim 2, wherein the impact parameters comprise an unpredictability of motion of the one or more objects in relative proximity to the vehicle in any direction from the vehicle.

9. The method of claim 1, wherein providing the alert further comprises determining a location of the vehicle relative to at least one of an intersection, a stop sign and/or a traffic light; and omitting the alert when the vehicle is stopped at the at least one of the intersection, the stop sign and/or the traffic light.

10. A system to contextualize proximity sensing around vehicles to reduce alarm fatigue for a driver of a vehicle, comprising:

at least one memory configured to store computer executable instructions; and at least one processor configured to execute the computer executable instructions to:

detect, by one or more sensors in communication with the vehicle, one or more objects in relative proximity to the vehicle in any direction from the vehicle;

determine a steering wheel position of the vehicle;

determine a speed of the vehicle;

determine a relative motion of the one or more objects in relative proximity to the vehicle in any direction from the vehicle;

determine a projected path of the vehicle based on the one or more objects in relative proximity to the vehicle in any direction from the vehicle, the steering wheel position of the vehicle, a rate of change of the steering wheel position of the vehicle, and what actions from the steering wheel and gas/brake control could create an impact;

determine an impact probability of the vehicle with the one or more objects based on the projected path of the vehicle and a relative motion of the object in relation to the vehicle;

determine a projected severity of impact based on impact parameters for the vehicle and the one or more objects; and provide an alert to the driver of the vehicle based on a level of the impact probability and the projected severity of impact, wherein the computer executable instructions to provide the alert comprise computer executable instructions to provide a general notice or a less intrusive alert when the one or more objects are in relative proximity to the vehicle and no impact is possible or likely, and provide a different alert when proximity is close and the projected path indicates that collision is an issue.

11. The system of claim 10, wherein the impact parameters comprise at least one of a size of the vehicle; a size of the one or more objects; an angle of impact between the vehicle and the one or more objects; and/or a relative velocity between the vehicle and the one or more objects.

12. The system of claim 10, wherein the computer executable instructions to provide the alert comprise computer executable instructions to vary at least one of a volume of an audible alert, a frequency of the audible alert, a pattern of the audible alert or a combination thereof based on level of the impact probability and the projected severity of impact.

13. The system of claim 10, wherein the computer executable instructions to provide the alert comprise computer executable instructions to provide a visual alert on a display visible to the driver of the vehicle, wherein the visual alert changes based on the level of the impact probability and the projected severity of impact.

14. The system of claim 10, wherein the computer executable instructions to provide the alert comprise computer executable instructions to omit an alert when the level of the impact probability and/or the projected severity of impact are below a relative threshold level.

15. The system of claim 10, further comprising computer executable instructions to: determine a mobility graph of the driver of the vehicle; determine a presence of one or more geofences related to the mobility graph of the driver; and provide a different alert to the driver based on the mobility graph of the driver, wherein the different alert is based on the commonality of the one or more objects in an historical travel pattern of the driver.

16. The system of claim 15, further comprising generating a trained machine learning model based on at least one of the mobility graph of the driver of the vehicle, the geofence and/or the historical travel pattern of the driver; and providing the alert based on the trained machine learning model.

17. The system of claim 11, wherein the impact parameters comprise an unpredictability of motion of the one or more objects in relative proximity to the vehicle in any direction from the vehicle.

18. The system of claim 10, wherein the computer executable instructions to provide the alert further comprise computer executable instructions to determine a location of the vehicle relative to at least one of an intersection, a stop sign and/or a traffic light; and omitting the alert when the vehicle is stopped at the at least one of the intersection, the stop sign and/or the traffic light.

19. A computer program product comprising a non-transitory computer readable medium having stored thereon computer executable instructions, which when executed by one or more processors, cause the one or more processors to carry out operations to contextualize proximity sensing around vehicles to reduce alarm fatigue for a driver of a vehicle, the operations comprising:

detecting, by one or more sensors in communication with the vehicle, one or more objects in relative proximity to the vehicle in any direction from the vehicle;

determining a steering wheel position of the vehicle;

determining a speed of the vehicle;

determining a relative motion of the one or more objects in relative proximity to the vehicle in any direction from the vehicle;

determining a projected path of the vehicle based on the one or more objects in relative proximity to the vehicle in any direction from the vehicle, the steering wheel position of the vehicle, a rate of change of the steering wheel position of the vehicle, and what actions from the steering wheel and gas/brake control could create an impact;

determining an impact probability of the vehicle with the one or more objects based on the projected path of the vehicle and a relative motion of the object in relation to the vehicle;

determining a projected severity of impact based on impact parameters for the vehicle and the one or more objects; and providing an alert to the driver of the vehicle based on a level of the impact probability and the projected severity of impact, wherein providing the alert comprises providing a general notice or a less intrusive alert when the one or more objects are in relative proximity to the vehicle and no impact is possible or likely, and providing a different alert when proximity is close and the projected path indicates that collision is an issue.

20. The computer program product of claim 19, further comprising operations for providing the alert comprises varying at least one of a volume of an audible alert, a frequency of the audible alert, a pattern of the audible alert or a combination thereof based on level of the impact probability and the projected severity of impact.

* * * * *